(No Model.) 2 Sheets—Sheet 1.

M. C. BOOTH.
FOCUSING ATTACHMENT FOR CAMERAS.

No. 559,885. Patented May 12, 1896.

Witnesses:
Henry Drury
J. H. Russell

Inventor:
Margaret C. Booth,
by her atty
H. W. Van Pouck

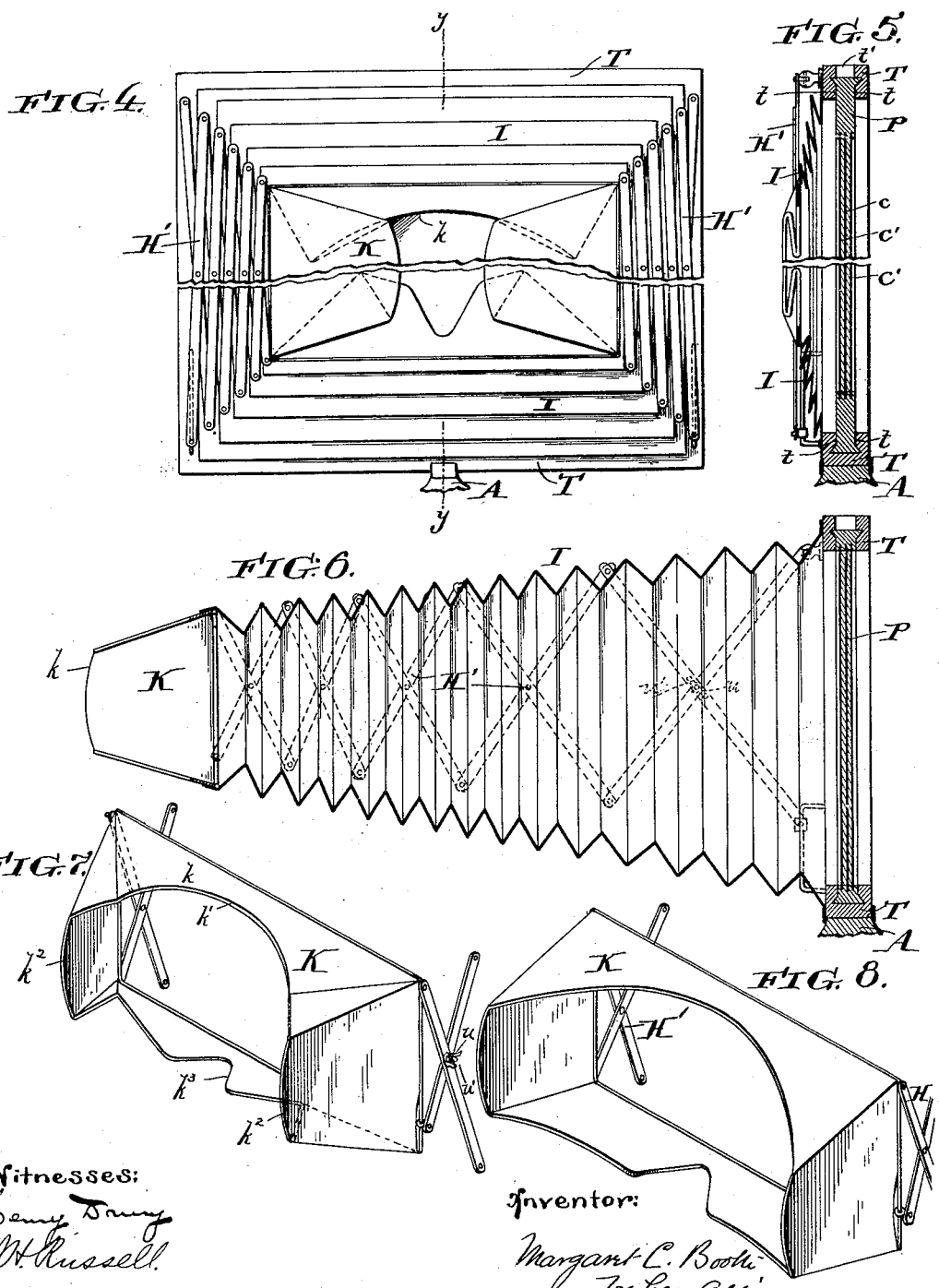

UNITED STATES PATENT OFFICE.

MARGARET C. BOOTH, OF HAVERFORD, PENNSYLVANIA.

FOCUSING ATTACHMENT FOR CAMERAS.

SPECIFICATION forming part of Letters Patent No. 559,885, dated May 12, 1896.

Application filed January 30, 1892. Serial No. 419,764. (No model.)

*To all whom it may concern:*

Be it known that I, MARGARET C. BOOTH, of Haverford College, county of Montgomery, and State of Pennsylvania, have invented a certain new and useful Improvement in Cameras, of which the following is a true and exact description, reference being had to the accompanying drawings, which form a part of this specification.

My invention relates to photographic cameras, particularly to such as are intended to be easily portable, and has for its chief object to provide a camera which shall be both light and strong and one capable of folding very compactly.

A further object is to provide a head bearing-piece which will fold into very small space, but which when distended will be of the contour of the human face, so as to effectually exclude the light, and also to provide an improved plate-holder frame which shall thoroughly exclude the light.

To accomplish these objects and to improve in general this class of devices, my invention consists, first, in supporting the lens by means of a set or sets of lazy-tongs so arranged that they may be clamped in any position to focus the lens; also, in arranging a plate-holder frame with a groove in it into which the plate-holder slides, so that no light can leak into the frame when the plate-holder is in position therein, and in the general arrangement of parts more specifically pointed out in the claims which are appended to and form part of this specification.

My invention is best described in connection with the accompanying drawings, in which—

Figure 1:
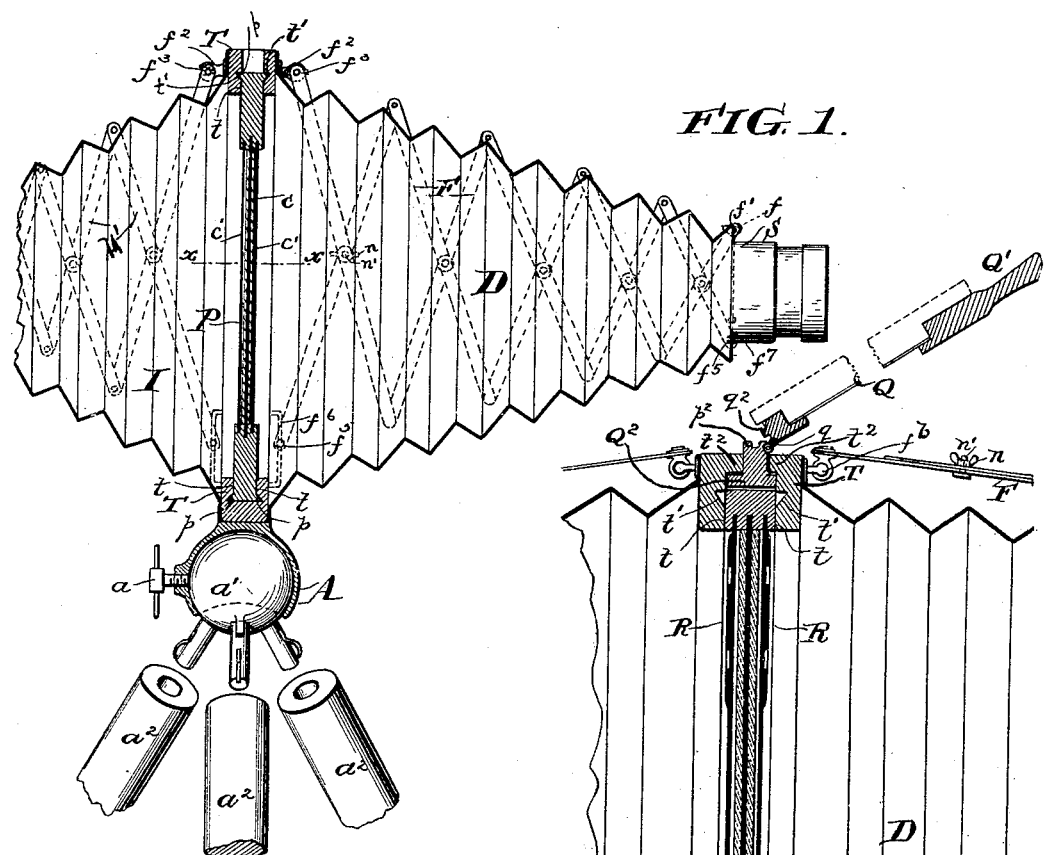
Figure 2:
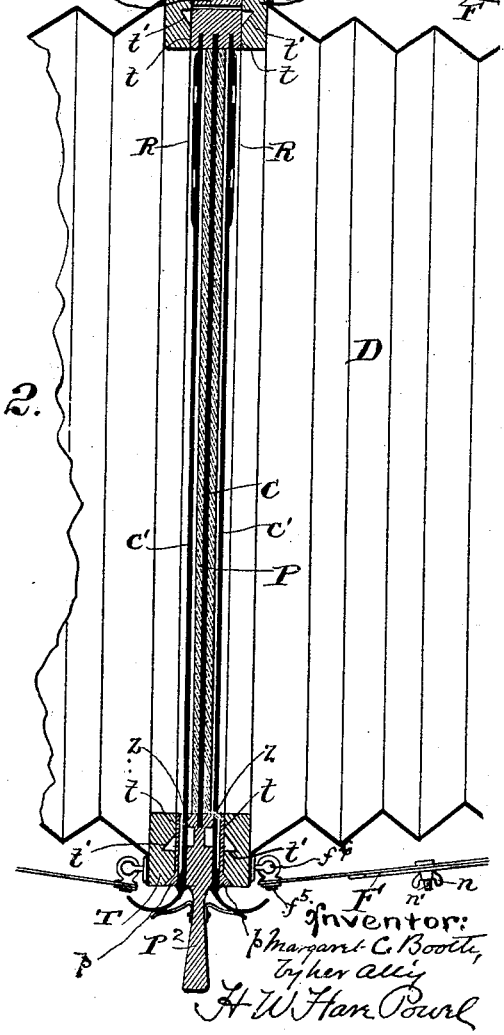
Figure 3:
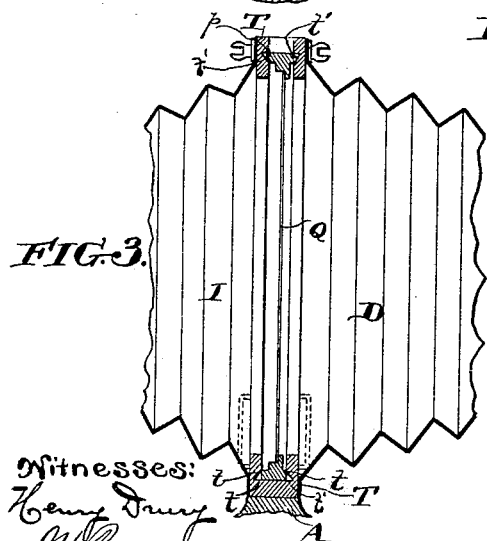

Figure 1 is a side view, partly in section, of a photographic camera embodying my invention, the head bearing-piece being removed. Fig. 2 is a sectional view on the line $x\ x$ of Fig. 1, showing the plate-holder frame and the plate-holder in position and the focusing-glass withdrawn and folded out of the way along the side of the camera. Fig. 3 is a view similar to that shown in Fig. 1, the focusing-glass and frame, instead of the plate-holder, being shown in position in the plate-holder frame. Fig. 4 is a rear view of the camera shown in Fig. 1 with the hood and head-piece collapsed. Fig. 5 is a sectional elevation on the line $y\ y$ of Fig. 4. Fig. 6 is a sectional side view showing the head bearing-piece and hood extended. Fig. 7 is a perspective view of the preferred form of my head bearing-piece, showing the crease-lines on which it may be folded, as shown in Fig. 4; and Fig. 8 shows a modified form of my head bearing-piece.

A is a hollow spherical socket formed integral with or rigidly attached to the center of the base of the camera-plate-holder frame T, and by means of this socket and the binding-screw $a$, ball $a'$, and legs $a^2$ the camera may be conveniently and adjustably supported; or, if desired, a plate with a hole tapped for the screw, arranged, as usual, in an ordinary tripod, may be used, if desired.

The plate-holder frame T has apertures on two adjoining sides, preferably on the right side and on the top, as shown in Fig. 2, in order that a plate-holder, as P, may be inserted either vertically or horizontally. In this frame T, made preferably square, or nearly so, and of the form as shown in Figs. 1 and 2, are formed vertical grooves or slot-ways $t$ in the sides of the frame and also corresponding horizontal grooves $t$ in the top and bottom of the frame. These slots are preferably beveled, as shown in Figs. 1 and 2, at $t'$, and the plate-holders have corresponding bevels or fillets $p$, as shown in Fig. 1, which fit into the beveled portion $t'$ of the slot and more effectually prevent any leakage of light into the frame. By this construction of the plate-holder frame a plate-holder can be inserted either vertically or horizontally to take either upright or horizontal pictures, and this is accomplished without the necessity for reversing the camera, and by sliding the plate-holders into a frame, such as shown, which incloses the holder both on the front and rear, instead of fastening them onto the plate-holder frame, the usual catches are done away with and the holder is firmly and conveniently held in position and the danger of leakage of light much lessened and when fillets $p$ are arranged on the plate-holder to fit into the beveled recesses $t'$ there is almost no chance of such leakage. A focusing-glass frame Q is also arranged to slide in the groove of the plate-holder frame T, preferably horizontally, as shown, and on the opposite side of the frames T from that in which the aperture is formed, by which the plate-holder P is inserted into the frame, an opening is made for the focusing-glass frame Q, preferably narrower than the width of the slot $t$. The ground glass is arranged, as usual, on this frame Q to occupy the same position as a sensitive plate will when put in position in the plate-holder, and I preferably arrange a handle Q' on the frame for convenience in drawing the frame Q out of the plate-holder T.

The frame Q is preferably made in its main portion Q thinner than the width of the slots $t$ and of substantially the same size as the opening in the left of the frame T, so as to be easily withdrawn therefrom, but has at $Q^2$ an enlarged portion which is of substantially the same width as the slots $t$ and arranged to slide therein, but cannot be withdrawn through the opening in the side of the plate-holder frame through which the main portion Q is withdrawn, thus acting as a stop and preventing the complete withdrawal of the focusing-glass frame.

To prevent the frame Q from forming an awkward projection when withdrawn, I preferably unite the two parts Q and $Q^2$ of the frame by a hinge at $q$, so that when the portion Q of the frame is withdrawn it may be folded sidewise against the camera-body out of the way. I also preferably tongue and groove the two meeting faces of the frame at $q^2 q^2$, as shown in Fig. 2.

To the front of the plate-holder frame T is secured a bellows D, preferably pyramidal, as shown, so as to more readily and completely collapse, and a lens-socket S is secured to the front end of the bellows. In order to extend the bellows and at the same time hold the lens-socket S in proper alinement with and parallel to the plate-holder frame T without the necessity of providing a rigid bed to support the lens, as is usual, I provide lazy-tongs F, preferably two sets, one on each side of the camera to support the lens-socket and bellows. These lazy-tongs are made preferably of iron, steel, or other rigid material and are attached at one end to the lens-socket S by pivots $f f'$ and slides $f^6 f^7$, and at the other end to the plate-holder frame T by corresponding pivots $f^2 f^3$ and slides $f^5 f^6$, as clearly shown in Fig. 1—that is to say, the lower ends of the tongs are provided with swivel-eyes $f^5 f^5$, which will turn on and slide up and down guides $f^6$, arranged vertically on the plate-holder frame, and similar guides $f^7$ on the lens-socket. The upper arms of the lazy-tongs are secured by horizontal pivots $f f^3$ to transversely-pivoted swivel-blocks $f' f^2$, respectively, in a manner perfectly obvious, so that the lazy-tongs can be distended, as seen in Fig. 1, or fold closely down over the bellows when they are closed.

In order to secure the lens-socket S at proper distances from the plate-holder frame T for the correct focusing of the lens, I provide a locking device for the tongs, preferably consisting, as shown in Figs. 1 and 2, of a winged nut $n$ and screw-bolt $n'$, which pass through two arms of the lazy-tongs and clamp them together.

By the arrangement of the tongs just described a very compact camera can be made, which will fold almost flat on the plate-holder frame T and which arrangement, while doing away with the customary bed, holds the lens in proper position relatively to the plate-holder frame and is capable of being secured by the clamping-nuts $n$ in any desired position.

To assist the operator in focusing the camera and to do away with the customary focusing-cloth, I arrange on the rear of the plate-holder frame T a bellows I, also preferably supported by sets of lazy-tongs H' similar to those which support the bellows D, and provide at the rear a head bearing-piece K, having curves $k' k^2 k^3$ to conform to the shape of the human face and so to effectually shut out the light which would interfere with focusing.

While the head bearing-piece K may be made, if desired, incapable of folding, as seen in Fig. 8, still to make the camera as flat and compact as possible I prefer to make the head bearing-piece collapsible and for this purpose preferably construct it of stout paper or stiff cloth fabric and crease it in any convenient way, one mode being shown in Figs. 4 and 7, so that it can be folded flat out of the way, as seen in Fig. 5, so as to present at the back as well as the front of the camera a very compact fold.

It will be noted, as shown in Figs. 7 and 8, that the head bearing-piece K is formed with its sides outwardly flaring in the direction of the focusing-glass, so that the view of the operator will be unimpeded.

In order to prevent the loss or mislaying of the slide P when it is withdrawn to expose a plate $c'$, arranged in the space $c$ of the plate-holder, I prefer to form the slide with a flexible hinge portion R, which will permit the slide to be folded over the side of the camera in the same manner as the focusing-glass frame, and I can also, if desired, arrange a stop to prevent the complete withdrawal of the slide in the same manner as the portion $Q^2$ prevents the withdrawal of the frame Q $Q^2$.

Having now described my invention, what I claim as new, and desire to secure by Letters Patent, is—

1. The combination in a camera of a plate-holder frame having apertures in two adjoining sides to admit a plate-holder, and having longitudinal and vertical grooves leading from the apertures, the whole being arranged substantially as specified, and so that the plate-holder frame will inclose a plate-holder placed therein both at the front and back, whereby a plate can be presented both vertically and horizontally in the camera and all danger from the improper leaking of light may be prevented.

2. The combination in a camera of a plate-holder frame having apertures in two adjoining sides to admit a plate-holder and having longitudinal and vertical outwardly-beveled grooves leading from the apertures, the whole being arranged substantially as specified and so that the plate-holder frame will inclose a plate-holder placed therein both at the front and back, whereby a plate can be presented both vertically and horizontally in the camera and all danger from the improper leaking of light may be prevented.

3. The combination in a camera of a plate-holder frame having apertures in two adjoining sides to admit a plate-holder and having longitudinal and vertical outwardly-beveled grooves leading from the apertures, the whole being arranged substantially as specified and so that the plate-holder frame will inclose a plate-holder placed therein both at the front and back, and a plate-holder having correspondingly-beveled edges adapted to slide in the grooves in the plate-holder frame, whereby a plate can be presented both vertically and horizontally in the camera and all danger from the improper leaking of the light may be prevented.

MARGARET C. BOOTH.

Witnesses:
JOSHUA MATLACK, Jr.,
J. H. RUSSELL.